United States Patent [19]

Ota

[11] Patent Number: 4,496,981
[45] Date of Patent: Jan. 29, 1985

[54] VIDEO CAMERA WITH A MONITOR

[75] Inventor: Isao Ota, Osaka, Japan

[73] Assignee: Matsushita Electric Industrial, Co., Ltd., Osaka, Japan

[21] Appl. No.: 626,594

[22] Filed: Jul. 5, 1984

Related U.S. Application Data

[63] Continuation of Ser. No. 351,929, Feb. 24, 1982, abandoned.

[30] Foreign Application Priority Data

Feb. 26, 1981 [JP] Japan .................... 56-27719

[51] Int. Cl.³ ................................ H04N 5/26
[52] U.S. Cl. ...................... 358/213; 358/224
[58] Field of Search ............... 358/85, 139, 55, 59, 358/185, 213, 224, 225, 241; 250/330, 370 G; 350/330, 331 R, 332, 333, 342; 357/24, 24 M, 24 LR, 41, 45

[56] References Cited

U.S. PATENT DOCUMENTS

| | | | |
|---|---|---|---|
| 2,833,758 | 9/1974 | Ferrari | 358/225 |
| 3,011,019 | 11/1961 | Rado | 358/209 |
| 3,479,515 | 11/1969 | Snavely | 250/330 |
| 3,655,269 | 4/1972 | Heilmeier | 350/333 |
| 3,777,061 | 12/1973 | Takemura | 357/24 |
| 3,946,270 | 3/1976 | Nishizawa | 358/241 |
| 4,303,322 | 12/1981 | Someya | 358/224 |
| 4,321,747 | 3/1982 | Takemura | 357/24 LR |
| 4,400,725 | 8/1983 | Tanigaki | 358/85 |

FOREIGN PATENT DOCUMENTS

| | | | |
|---|---|---|---|
| 4980 | 1/1981 | Japan | 358/213 |
| 119586 | 9/1981 | Japan | 358/85 |
| 158576 | 12/1981 | Japan | 358/213 |

OTHER PUBLICATIONS

A Charge-Coupled Device Image Processor for Smart Sensor Applications, by G. R. Nudd, et al., Proceedings of the Society of Photo-Optical, SPIE vol. 155, Image Understanding System & Industrial Application, (1978), pp. 15-22.

*Primary Examiner*—Tommy P. Chin
*Attorney, Agent, or Firm*—Wenderoth, Lind & Ponack

[57] ABSTRACT

A video camera with a monitor, which is provided integrally on both surfaces or the same one surface of a semiconductor substrate or a substrate having a semiconductor film thereon; an image pickup plate and a display unit in one functioning as the image pickup plate for converting an optical image into an electrical signal and the display unit for converting the electrical signal into a visual image; the camera is provided with an optical system for imaging the optical image on the pickup plate.

9 Claims, 6 Drawing Figures

VIDEO CAMERA WITH A MONITOR

This application is a continuation of now abandoned application Ser. No. 351,929, filed Feb. 24, 1982, now abandoned.

BACKGROUND OF THE INVENTION

This invention relates to a video camera with a monitor, comprising a solid state image pickup plate which is integral with a display unit.

In the past, for a video camera used with a video tape recorder (VTR), a two-dimensional solid state image pickup plate of a metal oxide semiconductor (MOS), a charge-coupled device (CCD), or a charge-injection device (CID), using a silicon semiconductor device, as well as a photoelectric conversion electron tube, such as a vidicon or Plumbicon, have been used. Such a video camera may include an optical system for observing an optical image of the scene or may be provided with a display unit called a video monitor used to display a bright and easy-visible image on a basis of electric signals obtained by a pickup tube. The latter, for example, uses a small-sized cathode ray tube (CRT) usually of about a 1.5 inch size. To make the video camera more compact, lightweight, and have a lower power consumption, the photoelectric converter tube has been replaced by a thin, small-sized, solid state image pickup plate. However, the video camera is still limited in its miniaturization and weight-reduction. Accordingly, it is also desirable for the display unit to be small-sized, lightweight, and have a lower power consumption and at present, a liquid crystal matrix TV display panel is being considered as a leading condidate for use in such a display unit.

At present, one typical liquid crystal TV display comprises a liquid crystal layer interposed between the metal oxide semiconductor-field-effect transistor (MOS-FET) switch and capacitor array and the transparent electrode, which has been proved to be effective for use in the matrix picture display.

Therefore, it is now technically possible that the use of the solid state image pickup plate employing silicon and a liquid crystal TV display panel comprising the silicon MOS-FET array and a liquid crystal layer can produce a video camera having a monitor yet is small-sized, lightweight and has a low power consumption. The largest problem, however, is the high manufacturing cost of the camera. Unfortunately, a low cost is strictly desired.

SUMMARY OF THE INVENTION

An object of the invention is to provide a video camera having a monitor and which is compact and inexpensive to produce, and which meets the abovenoted requirements.

BRIEF DESCRIPTION OF THE DRAWINGS

Next, an embodiment of the invention will be described in accordance with the drawings in which.

DESCRIPTION OF THE PREFERRED EMBODIMENTS

Figure 1:
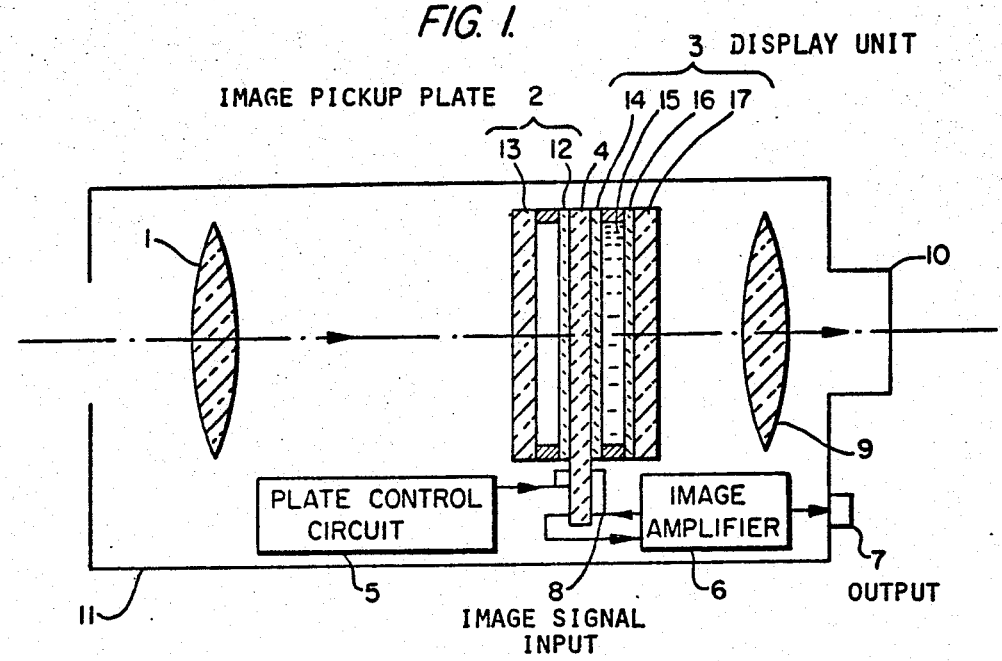
FIG. 1 is a schematic block diagram of an embodiment of the present invention and illustrates a video camera having a monitor.

An optical image of a scene, as shown in FIG. 1, imaged by an optical pickup system 1 and converte into an electrical signal by a solid state image picku plate 2 which is driven by a pickup plate control circu 5, the electrical signal being used as an image inform tion signal for a television receiver or VTR through a image amplifier 6 and an image signal output terminal is also fed to an image signal input terminal 8 of a di play unit 3 so as to be converted therein into visu information and display, thus being observed throug an optical finder system 9 by means of a finder unit 1 which is provided on a camera body 11. In additior power for the image pickup plate 2 and the display un 3 is supplied by a power source (not shown) which i housed in the camera body 11 or is supplied externall In FIG. 1, the solid state image pickup plate 2 an display unit 3 are provided on opposite surfaces of semiconductor substrate 4, enabling the common use c semiconductor substrate 4 and thereby enabling th miniaturization of the camera.

The solid state image pickup panel 2 comprises two-dimensional solid state image sensor 12 havin¡ MOS, CCD or CID devices and an image sensor pro tection panel 13 of glass or the like, provided on on surface (the left-hand surface of FIG. 1) of the semicon ductor substrate 4 which is composed of silicon or th like. The display unit 3 comprises, for example, a MOS FET array, a display medium 15, a transparent elec trode 16, and a transparent substrate 17, which are pro vided on the opposite surface (the right-hand surface ir FIG. 1) of the semiconductor substrate 4.

The pickup panel 2 is usually required to have $240 \times 350$ or more picture elements (PIXELS) for obtaining a good picture quality, but for the monitor, a far smaller number of picture elements are useable. The present technique makes possible the compaction of the necessary picture elements into an area of the size of about 1 cm$^2$. It is not indispensable to make the pickup surface of image pickup plate 2 equal in size to the display surface of display unit 3, but the construction of chips which are as small as possible is advantageous to reduce the manufacturing cost. Since a size of about 1 cm$^2$ is too small for the usual display unit, it is desirous to provide the optical finder system 9 to thereby provide an enlarged surface as shown in FIG. 1.

The semiconductor substrate 4 used in this invention may employ a Group III-V family semiconductor substrate of silicon, gallium phosphide (GaP), gallium arsenide (GaAs), etc., a Group II-VI family semiconductor substrate of cadmium sulfide (CdS), cadmium selenide (CdSe), cadmium tellurium (CdTe), etc., of a substrate of glass, quartz, sapphire, ceramic or the like, provided on both surfaces with semiconductor films which are polycrystalline, or amorphous. In the latter substrate, the semiconductor materials on both surfaces need not be the same. The TV camera of the present invention of course is usable not only for viewing visual images but also for invisible images, such as in the infrared, ultraviolet, or X ray cases, whereby the spectral sensitivity of image pickup plate 2 and the protection panel 13 are selectively used to meet the respective purposes. The CCD type image pickup plate usually has a photoelectric conversion function, signal storage function and self-scanning function so as to obtain time-series (i.e.—serial) signals containing the optical image information.

On the other hand, an MOS type image pickup panel usually adopts the X-Y address system, and photoelectric conversion elements being provided at the nodes of the X-Y electrodes so as to form the X-Y matrix, the X and Y scanning circuits performing the two-dimensional addressing so as to detect the picture element signal charges in a time serial fashion. A CID type image pickup plate also adopts the X-Y address system so as to detect an amount of charge injected into the MOS capacitors at the X-Y nodes by means of the X-Y scan. The image pickup plate of course may be formed of a switch array, such as a TFT array. The circuits for scanning the image pickup plate 2 are provided on the semiconductor substrate 4, and may be of a monolithic or hybrid IC construction.

Figure 2:
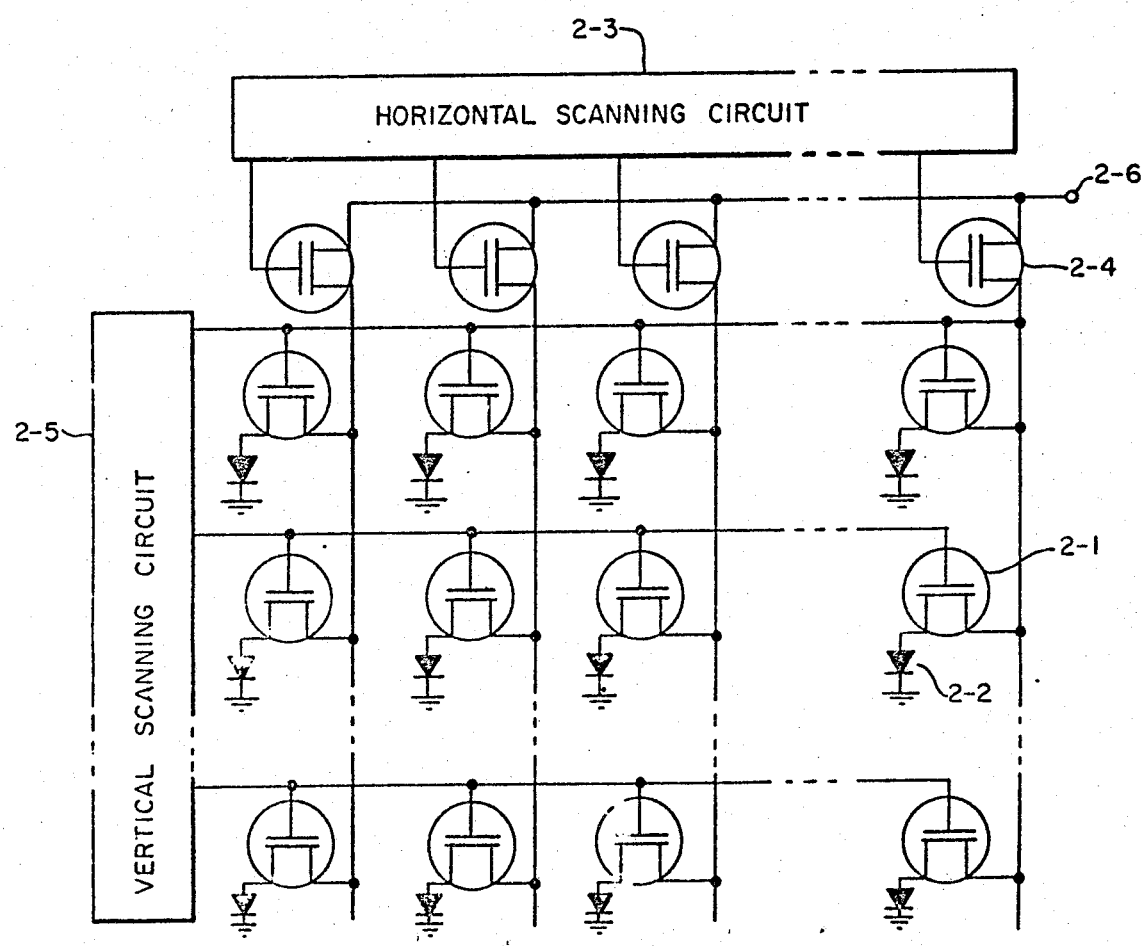
FIG. 2 shows the principle of a pickup plate.

FIG. 2 shows the principle of an exemplary MOS type image pickup plate, in which, at a node of the two-dimensional X-Y matrix, an MOS transistor 2-1 and a photodiode 2-2 are connected in series, the photodiode 2-2 storing therein the signal charge. A vertical scanning pulse from a vertical scanning circuit 2-5 is fed to the gate of picture element MOS transistor 2-1, and a horizontal scanning pulse from a horizontal scanning circuit 2-3 sequentially selects a switching transistor 2-4 at the horizontal scan side and feeds the scanning pulse to the drain of each MOS transistor at the picture element side, so that the irradiation of the light removes, in a time serial arrangement, the picture element signal charges and outputs a signal corresponding thereto from an image signal output terminal 2-6.

On the other hand, the display unit 3 usually adopts an X-Y matrix configuration, and at the nodes of matrix switching elements are provided, (for example, and FET, TFT or diode, or non-linear elements), and a storage means is provided, if necessary, so that the picture element comprising the picture element electrode, display medium, and transparent electrode at the display observation side is connected in series to the switch element or the like. Such display units, as described above, having an X-Y matrix configuration with such switching elements at the nodes of the matrix are generally called active matrix type display units. As a result, the X, Y electrode driving circuit selectively displays the picture elements. The X, Y electrode driving circuit may be formed in the monolithic IC on the semiconductor substrate 4 similarly to the FET array, or in a separate hybrid IC.

Figure 3:
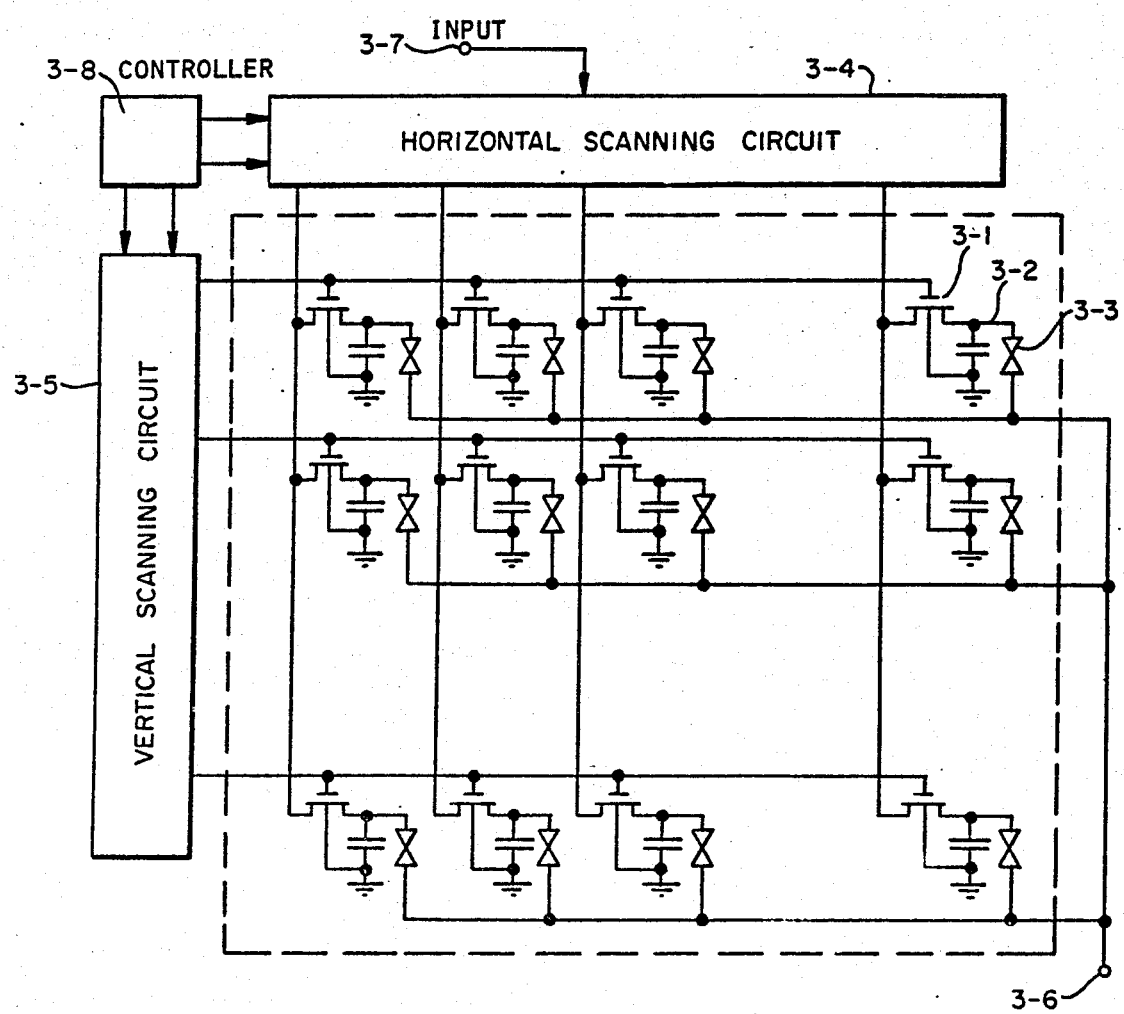
FIG. 3 shows the principle of a display unit having semiconductor switching elements.

FIG. 3 shows a basic construction of the display unit 3 using, for example, an MOS transistor array. At each node of the matrix, an MOS-FET 3-1, a storage capacity 3-2, and a display picture element 3-3 are provided. The image signal from the image pickup plate 2 is moderately amplified and thereafter the picture element storage capacity 3-2 is charged, thereby applying voltage to the display picture element 3-3. The one-side electrode 3-6 connected to display picture element 3-3 is common to all of the picture elements and corresponds to the transparent electrode 16 of display unit 3 as is shown in FIG. 1. Terminal 3-7 is an image signal input terminal, and element 3-8 is a controller for the line scan and the signal wire driving circuit.

The display unit 3 of the invention is usable with various display methods of both the luminous and not-luminous varieties; in other words, the display unit may be of the luminous type, such as an electroluminescence or slow electron irradiation fluorescence display or the not-luminous type, such as a liquid crystal, electrophoretic, or electrochromic display. In a case of the use of a not-luminous type of display, an illumination source, if necessary, is provided in the camera. Alternatively, the display unit 3 of course may comprise a light-emitting diode (LED) element formed directly on the semiconductor substrate 4 in matrix.

In the abovenoted description, one image pickup plate 2 and one display unit 3 are used both for generating the monochromic image signal and for the monitor display. A color camera, however, uses an image pickup plate of the three-plate, two-plate or single-plate configuration. It is not impossible to reproduce color images by the use of a single-plate type image pickup plate which is provided at the display surface with a mosaic color filter or a stripe color filter. When the image pickup plate, for example, is of the three plate type, and is used for an improvement in the picture quality, three pairs of display units are also provided at the rear surface of each respective image pickup plate and red, green and blue color filters are provided at the front surface of the display units corresponding to R, G and B signals obtained from the respective image pickup plate for R, G and B colors, so that each color-optical image can be optically composed and monitored as one color picture. At the pickup plate side, a tricolor decomposition of the objective optical image is performed by the use of a dichroic mirror of the like, and at the display unit side, the three primary color optical images are composed. In order to reproduce the color image by use of the single plate type image pickup plate, the number of picture elements of the display unit must be three times the number of those used for a monochromatic image, but the image pickup plate of the tricolor optical image composition type is advantageous in the use of the display unit having a number of picture elements corresponding to that of the usual monochromatic image.

In the aforesaid description, the image pickup plate 2 and display unit 3 use a common substrate and the electrical signal obtained from the image pickup plate 2 is scanned by the display unit 3 and reconstructed thereat, and fed as the image signal to the dsiplay unit 3. However, photosensor units in the image pickup plate 2 are surely disposed in the two-dimensional matrix, each sensor unit constituting the picture element unit at the pickup image side, whereby when the picture element at the image pickup plate side and that at the display unit side are electrically coupled together with a one to one correspondence, a potential must be generated at the picture element location at the pickup plate side and between the light-irradiation picture element and the non-light-irradiation picture element, which potential can be used directly as the drive signal for the display picture unit. In fact, it has been proposed that laminations of display medium, such as liquid crystal, electrophoretic display system, or electroluminescence layer, and, for example, photoconductive layer, be interposed between the electrodes, so that the display image corresponding to the optical image irradiated on the photoconductor is formed at the display medium side.

When the semiconductor substrate used in this invention comprises the semiconductor itself and is thin, it is possible to constitute an electrical coupling at the picture element location corresponding to the display unit at the rear side with respect to each picture element at the image pickup plate side. In this instance, the switch array in the matrix and scanning circuits are not inevitably provided on the display unit side, but the display unit comprises a picture element electrode array, display unit and transparent electrode, which are electrically coupled at a location corresponding to the picture element location on the image side.

Figure 4:
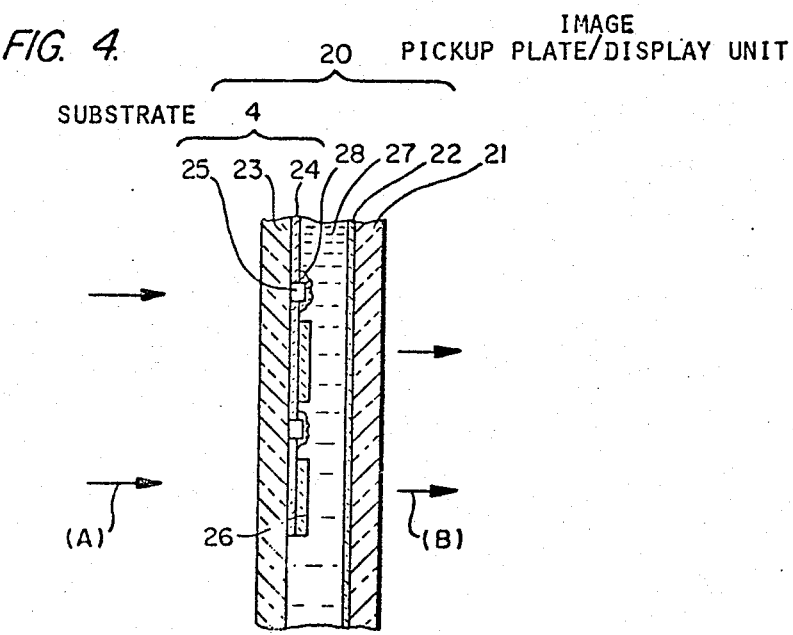
FIG. 4 is a sectional view of a principal portion of a modified embodiment of the present invention.

Furthermore, a modified embodiment of the invention, as shown in FIG. 4, comprises a combined image pickup plate-and-display unit 20, which are integral with each other on the same surface. In this instance, there is not need for electrical connections perforating the substrate from the picture element location of the image pickup plate to the rear side picture element location. When the combined image pickup plate-and-display unit 20 has a transparent substrate 21 at the display unit observation side and a transparent electrode as shown in FIG. 4, the displayed image (B) with respect to the incident objective optical image (A) is observable from the opposite side to the optical system 1 in the same fashion as the configuration shown in FIG. 1. The semiconductor substrate 4 in FIG. 4, for example, comprises a transparent substrate 23, a semiconductor switching element matrix array layer 24, and picture element photoelectric conversion elements 25, and is provided on the substrate 4 with picture element electrodes 26 having light reflection or light absorption properties; the picture element electrodes 26 and matrix array layer 24 are electrically connected to a picture element signal source, a display medium 27 being interposed between the picture element electrodes 26 and the transparent substrate 21 at the observation side. Each picture element photoelectric conversion element 25 is covered with a light-shielding layer 28 so as to not be adversely affected by the emitted light from the luminous display medium or by the illumination light from the not-luminous display medium. The semiconductor switching element matrix array layer 24 is arranged so as to detect the intensity of the incident light from the objective optical image and simultaneously feed a voltage to the picture element electrode 26 corresponding to the intensity of the incident light.

Figure 5:
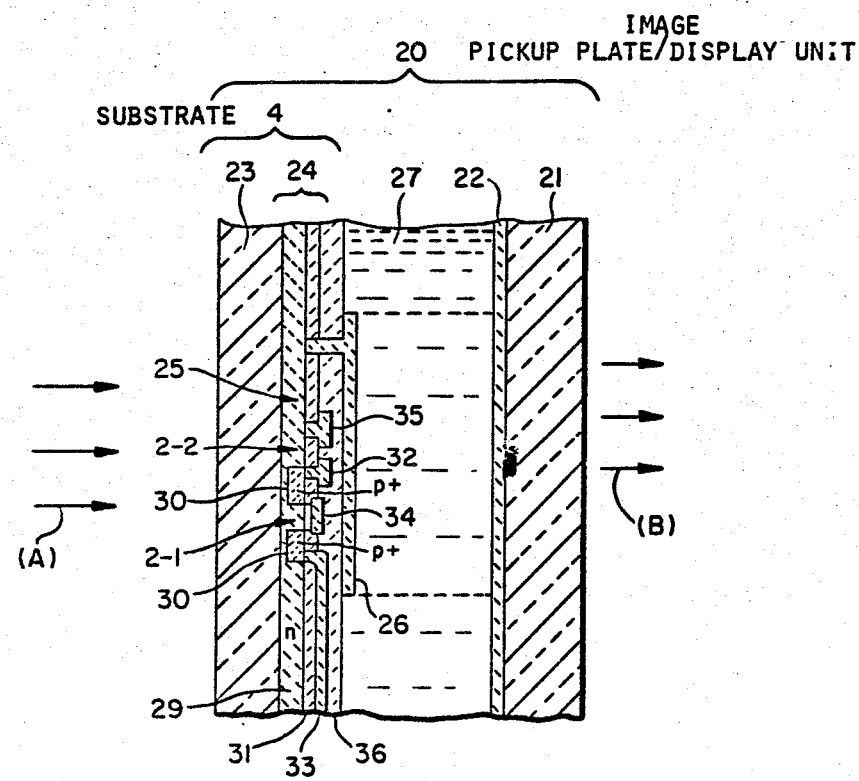
FIG. 5 is an enlarged sectional view of one pictu element unit.

FIG. 5 shows an embodiment of a combined image pickup plate-and-display unit 20, which use the semiconductor element matrix array layer 24 to form the display image on the opposite side to the objective optical image faceplate. In the embodiment in FIG. 5, an insulating transparent substrate 23 of sapphire or the like is provided with a semiconductor film 29 of silicon or the like, and on the film 29 the following elements are provided using a usual silicon-on-sapphire (SOS)-large scale integration (LSI) technique: a doping layer 30, an insulating oxide-film 31, a source 32, a drain 33, and a gate 34. A photodiode 2-2 is interposed between the source 32 and a common electrode 35 for the picture elements to form one picture element in the image pickup plate matrix shown in FIG. 2. Hereupon, between the electrode 35 which is common to the picture elements 35 and the picture element electrode 26 a photoelectric conversion element 25 is provided having a photoconductive effect which is separate from that of the photodiode 2-2, so that the incident light, corresponding to its intensity, changes a resistance value of the photoelectric conversion element 25 together with the photodiode 2-2. When the electrode 22 is supplied with DC or AC voltage with respect to the electrode 35 which is common to each picture element, the luminance brightness of display unit corresponds to the intensity of incident light because the photoelectric conversion element 26 and display element are connected in series between the electrodes 35 and 22. In this embodiment, the display element and the pickup plate side circuit are independent of each other, thereby not requiring a scan for the display. Hence, the display element can be lit quite independently of the scanning process for producing the video signal at the pickup plate, thereby enabling the display of image with 100% duty cycle.

In addition, the light-sensitive unit at the pickup plate side is screened by an opaque picture element electrode 26 and an insulating layer 36 and hides behind the electrode 26 when viewed from the display image side, thereby preventing the unnecessary light at the display side from projecting into the sensitive unit. The SOS substrate, for example, used herewith, needs a very thin semiconductor film 29 so that the light completely reaches the photodiode or photoelectric conversion element formed in the semiconductor surface region, or the doping is made deep to form the light-sensitive unit in close proximity to the substrate 29.

Figure 6:
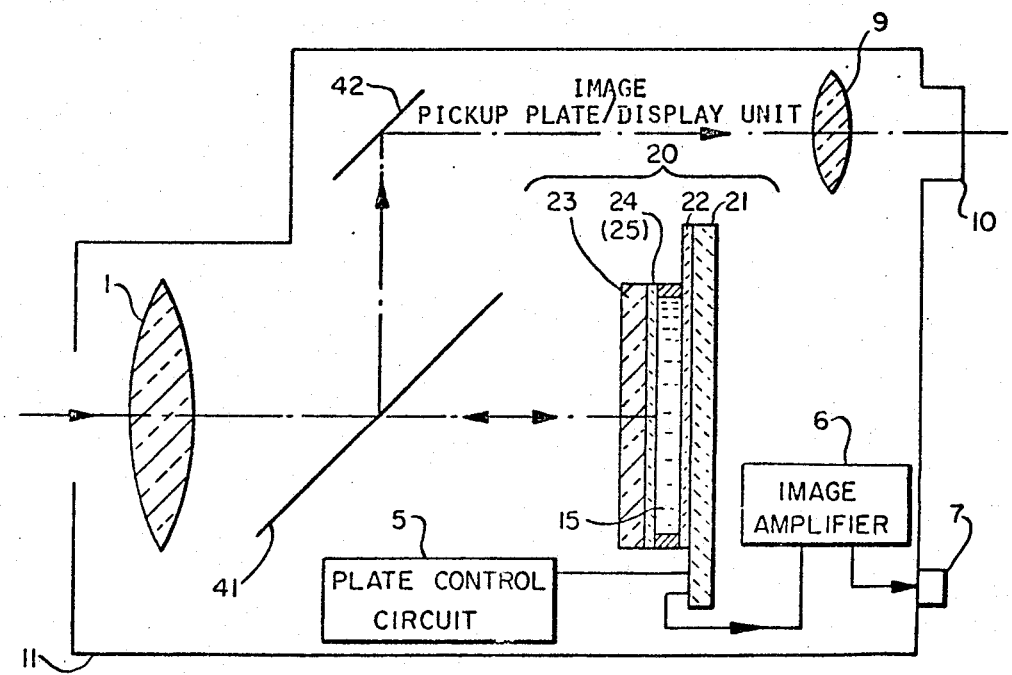
FIG. 6 is a block diagram of another modified e1 bodiment of the present invention.

FIG. 6 shows a modification of FIG. 1, in which the camera uses a combined image pickup plate-and-display unit 20 (the pickup plate and display unit in combination, which constitutes the display image at the objective optical image side. In other words, the display image formed at the objective optical image side by the image pickup plate-and-display unit, is changed in its optical path by a semi-transparent reflecting plate 4 and a mirror 42, and guided into a finder 10 through the finder optical system. Hereupon, the combined image pickup plate-and-display unit 20 may have a transparent or opaque substrate 21 and electrode 22, but the picture element electrode 26, differently from FIG. 4, uses the transparent body and the semiconductor substrate 4 and is formed of, for example SOS, so that the switching elements at the matrix array layer 24 and the wiring between the elements are provided within a gap between the picture element electrodes 26.

As described in the aforesaid various embodiment, this invention is characterized in that the pickup plate integral with the monitoring display unit, and various modifications in configuration are included in this invention.

This invention of course includes the application thereof to the imaging and monitor display unit with video camera which is integral with a small-sized video deck, the so-called 8 mm video.

As seen from the above, the video camera of this invention, which provides an image pickup plate integral with the display unit, has the following effects: Namely, the semiconductor process of forming the image pickup plate of MOS or CCD or the like is alike in many points to the process of manufacturing the switch array for a display unit or array including capacitance. From the viewpoint of the process, for example, the resist-coating of the wafers and mask exposure are easy to perform simultaneously or sequentially for both surfaces of a substrate; the semiconductor processes such as thermal oxide-film formation, ion diffusion, electrode formation, epitaxial growth, washing, drying, etching, etc., each are performable almost simultaneously for both surfaces; and the image pickup plate and display unit array can often be formed by the same semiconductor material to thereby enable a considerable decrease (e.g.-50%) in the total cost for the semiconductor material and the production processes.

Also, it is advantageous that the solid state image pickup plate and display unit have, for example, a part, such as the scanning circuit, in common, so that only one scanning circuit need be provided.

Thus, the image pickup plate integral with the display unit provided on both the surfaces or the same one surface is considerably cheaper to produce with respect to the cost of the materials and processes when compared with the separate element configuration.

What is claimed is:

1. A video camera with a monitor, comprising:
   an optical system for imaging an optical image;
   an image pickup-and-display unit which comprises an image pickup portion formed on one surface of a semiconductor substrate for converting said optical image to an electrical signal, and an active matrix type image display portion formed on another opposite surface of said semiconductor substrate for converting said electrical signal to a visual image, said semiconductor substrate being common to both said image pickup portion and said image display portion;
   an image pickup portion control circuit for controlling said image pickup portion.

2. A video camera with a monitor according to claim 1, wherein said semiconductor substrate is formed of crystalline silicon.

3. A video camera with a monitor according to claim 1, wherein said semiconductor substrate comprises an insulating substrate provided on both surfaces thereof with one of either a monocrystalline, polycrystalline, or amorphous semiconductor film.

4. A video camera with a monitor according to claim 1, wherein said image display portion comprises one of either a liquid crystal display system, an electrophoretic display system, an electrochromic layer, an electroluminescence layer, or a fluorescent layer for a slow electron cathode luminescence.

5. A video camera with a monitor, comprising:
   an optical system for imaging an optical image;
   an image pickup-and-display unit which comprises an image pickup portion formed on one surface of a semiconductor substrate for converting said optical image to an electrical signal, and an active matrix type image display portion formed on said one surface of said semiconductor substrate for converting said electrical signal to a visual image, said semiconductor substrate being common to both said image pickup portion and said image display portion;
   an image pickup portion control circuit for controlling said image pickup portion; and
   an image amplifier coupled to said image display portion for amplifying the electrical signal from said image pickup portion.

6. A video camera with a monitor according to claim 5, wherein said semiconductor substrate is formed of crystalline silicon.

7. A video camera with a monitor according to claim 5, wherein said semiconductor substrate comprises an insulating substrate provided on one surface thereof with one of either a monocrystalline, polycrystalline, or amorphous semiconductor film.

8. A video camera with a monitor according to claim 7, wherein said insulating substrate is formed of sapphire and said semiconductor film is formed of crystalline silicon.

9. A video camera with a monitor according to claim 5, wherein said image display portion comprises one of either a liquid crystal display system, an electrophoretic display system, an electrochromic layer, an electroluminescence layer, or a fluorescent layer for a slow electron cathode luminescence.

* * * * *